United States Patent [19]

Moore

[11] Patent Number: 4,672,208

[45] Date of Patent: Jun. 9, 1987

[54] PARTICLE DETECTOR CRYSTAL AND RELATED PARTICLE DETECTOR ASSEMBLY

[75] Inventor: John F. Moore, Lake Bluff, Ill.

[73] Assignee: Kabushiki Kaisha Toshiba, Kawasaki, Japan

[21] Appl. No.: 796,399

[22] Filed: Nov. 8, 1985

[51] Int. Cl.⁴ .............................................. G01T 1/202
[52] U.S. Cl. ..................................... 250/368; 250/367
[58] Field of Search ............. 250/363 R, 363 SR, 366, 250/367, 368, 361 R, 486.1

[56] References Cited

U.S. PATENT DOCUMENTS 3,930,160 12/1975 Swinehart ........................... 250/361
4,267,452 5/1981 Govaert .............................. 250/366

FOREIGN PATENT DOCUMENTS 2237206 2/1975 France ................................ 250/367
523481 1/1977 Japan .................................. 250/367

OTHER PUBLICATIONS

Heyda et al., "A Third Generation Digital Gamma Camera", Baird Corp., Application of Optical Instrumentation in Medicine III, Proc. SPIE, vol. 454, pp. 478–484, 1984.

"Mobile Camera Images Heart with High Resolution", Diagnostic Imaging, Jul. 1984.

Primary Examiner—Carolyn E. Fields
Attorney, Agent, or Firm—Finnegan, Henderson, Farabow, Garrett & Dunner

[57] ABSTRACT

A particle detector crystal comprising a diamond-shaped crystal scintillation material having 60 degree and 120 degree apexes and having at least one slot extending from a lower surface of that crystal into the interior of that crystal in a direction substantially parallel to a minor diagonal axis of the crystal a distance sufficient to reduce internal light bounce within that crystal. A plurality of such particle detector crystals are employed in groups of six each arranged with the 60 degree apexes of the crystals in each group positioned contiguous to each other to form a six-pointed star and further employing a plurality of light detectors arranged in a hexagonal array with each detector located above a respective situs of the contiguous 60 degree apexes.

16 Claims, 4 Drawing Figures

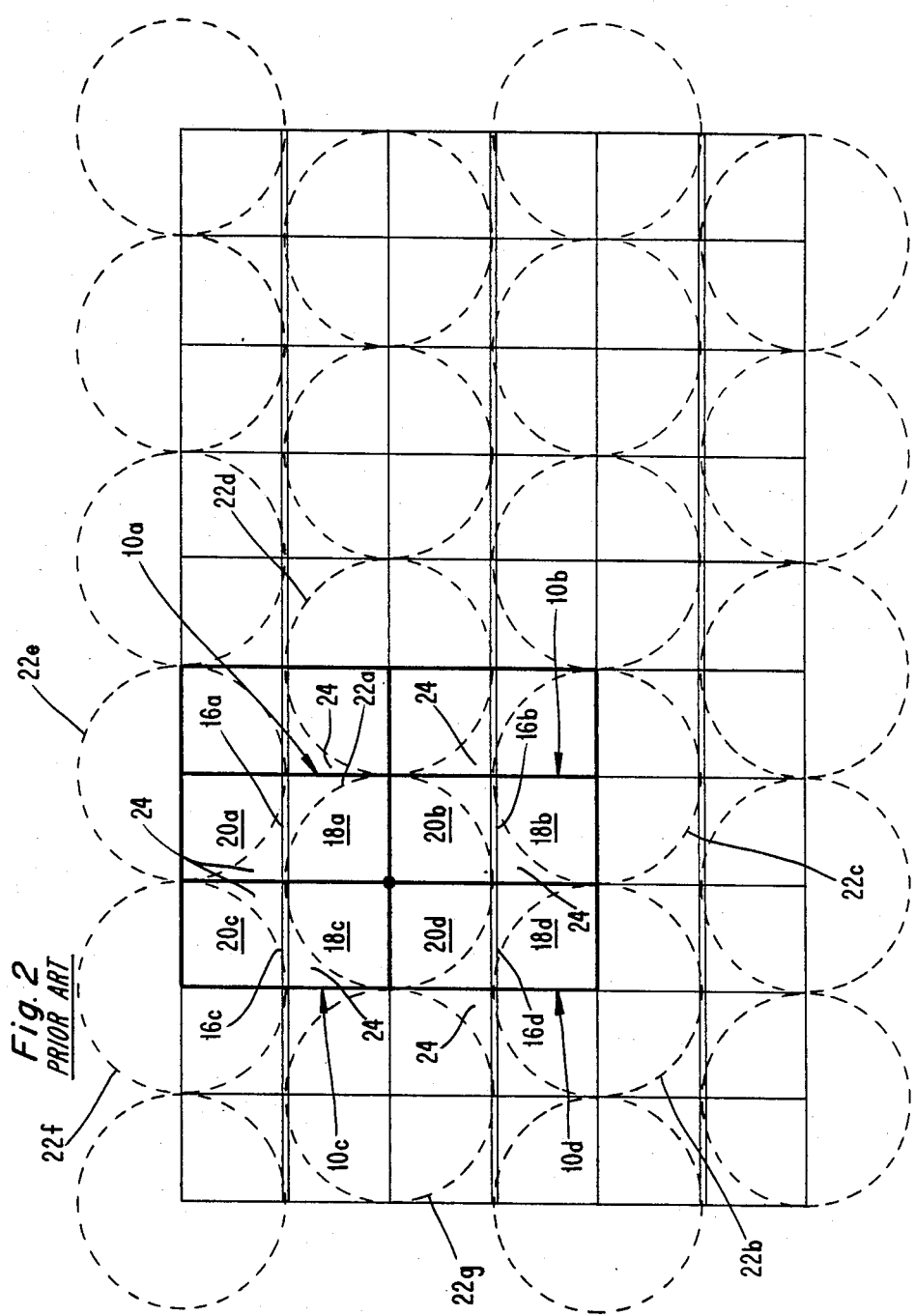

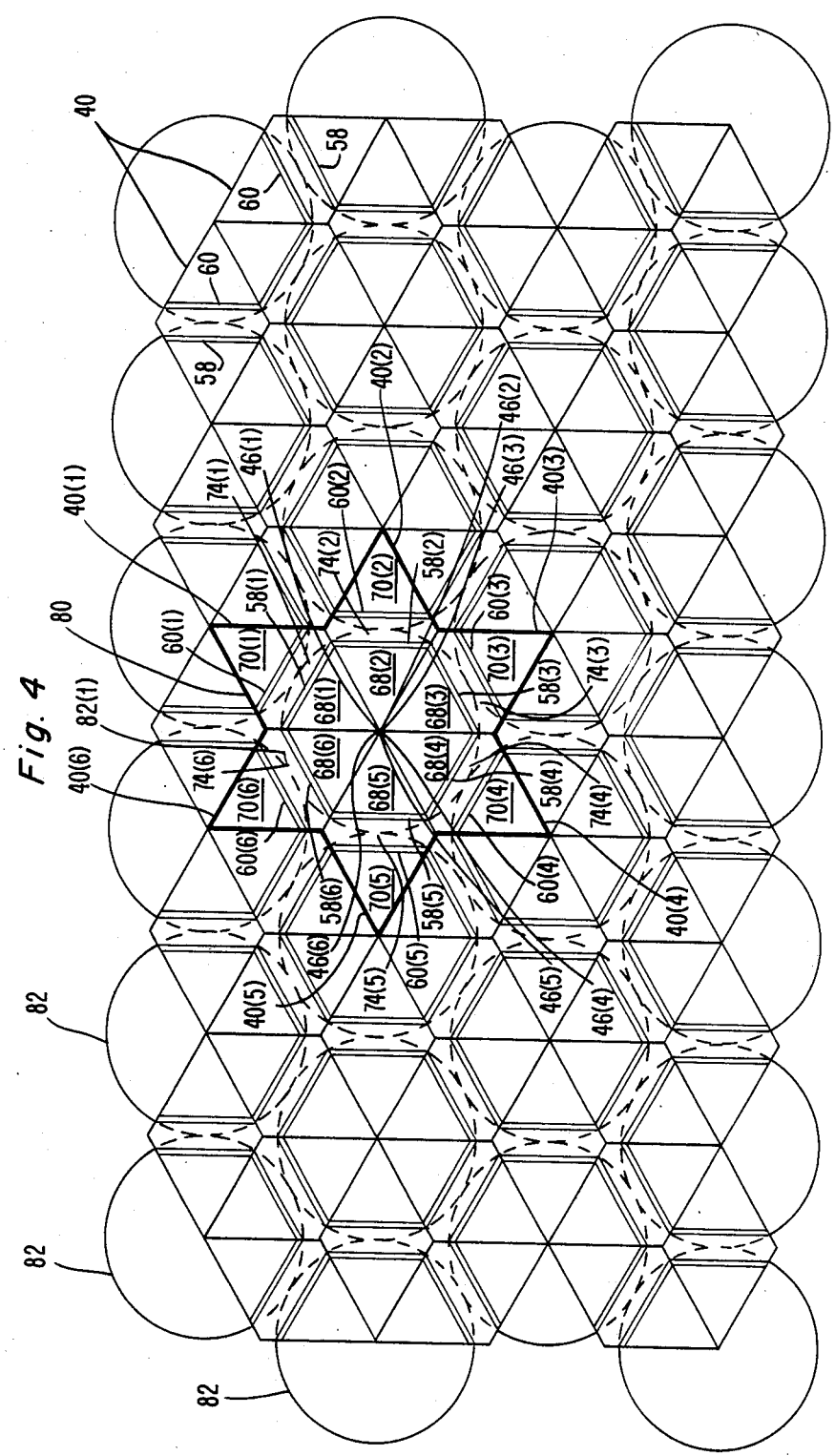

PARTICLE DETECTOR CRYSTAL AND RELATED PARTICLE DETECTOR ASSEMBLY

BACKGROUND OF THE INVENTION

I. Field of the Invention

The present invention relates to a particular structure for a particle detector crystal and a particle detector assembly incorporating a plurality of those particle detector crystals.

II. Background Information

Standard Anger scintillation camera assemblies are known which employ a lead collimator, a plurality of scintillation crystals, preferably comprised of NaI(Tl), and a plurality of photomultiplier tubes, with each crystal having a corresponding photomultiplier tube. Such cameras are employed to detect the emission of atomic particles, typically in the form of gamma ray photons, from a radioactive material which typically is injected in diagnostic amounts into a human body or the like. Each such particle emission is considered an event. By using a plurality of individual crystals, a percentage of such events may be detected by one crystal without necessarily affecting the capacity of the camera to detect a simultaneous event with another crystal.

At one point those skilled in the art believed that if a particle struck a particular section of a scintillation crystal the resulting light given off throughout that crystal would be proportional to the location of the incident particle. However, in practice light was found not to be proportionately distributed due to internal bounce. Accordingly, the prior art developed a particle detector crystal which employed a plurality of cuts which extended partially through the crystal to prevent internal bounce within the crystal, thereby effectively segregating the crystal into areas defined by those cuts. For example, U.S. Pat. No. 4,267,452 issued to Govaert discloses one such particle detector crystal employing cuts. The contents of Govaert are hereby expressly incorporated herein by reference.

When employing particle detector crystals having slots or cuts therein to reduce internal light bounce, photodetectors may be arranged in connection with such crystals so as to permit the section of the crystal to be identified within which a light producing event occurred. For example, in FIG. 1 there is illustrated a plurality of particle detector crystals 10a-d each of which comprises a crystal scintillation material which produces light when struck with a particle. Each crystal 10a-d is shaped with substantially parallel upper and lower surfaces 12a-d and 14a-d, respectively, which, as illustrated in FIG. 1, are each rectangularly shaped. An interconnecting sidewall is illustrated in FIG. 1 for each of crystals 10a-d in order to shape each crystal in the form of a solid rectangle.

In the absence of any slot within such crystals, a particle striking any portion of lower surfaces 12a-d would result in a light producing event in a corresponding position within crystal 10a-d, but the resulting light, due to internal bounce, would dissipate throughout the crystal and be released in approximately uniform intensity throughout upper surfaces 14a-d.

In order to reduce such internal light bounce so that resulting light from upper surfaces 14a-d is given off proportional to the location of an event within crystals 10a-d, the prior art, as evidenced by Govaert, employed at least one slot 16a-d in each crystal 10a-d extending from lower surfaces 12a-d into the interior of crystals 10a-d in a direction substantially parallel to an end wall of each of crystals 10a-d. As noted in Govaert, if crystals of approximately four centimeter height are employed, slots 16a-d are preferably on the order of three centimeters in height and approximately one to two millimeters in width. In addition, to further minimize distribution of light bounce within crystals 10a-d, each of slots 16a-d, may be filled with a light reflection material. Thus, slots 16a-d operate to effectively divide lower surfaces 12a-d into sections 18a-d and 20a-d, respectively.

Although not illustrated in FIG. 1, upper surfaces 14a-d may also be formed to incorporate exit windows of the type disclosed in Govaert which correspond one to each of sections 18a-d and 20a-d.

Crystals 10a-d of FIG. 1, accordingly, operate to provide light output from upper surfaces 14a-d which is distributed over those surfaces as a function of whether or not the particles causing the corresponding light producing event was incident in sections 18a-d or sections 20a-d of lower surfaces 12a-d. This discrimination in resultant light intensity from upper surfaces 14a-d, when detected, provides some degree of resolution for locating a light producing event within the volume defined by crystals 10a-d.

To detect light emitted from upper surfaces 14a-d, a plurality of photomultiplier tubes are employed in conventional particle detector assemblies. These photomultiplier tubes are typically circular in cross-sectional area and, when used in conjunction with particle detector crystals having slots formed therein to reduce internal light bounce, such photomultiplier tubes are typically staggered in location across two or more such detectors.

For example, as illustrated in FIG. 1 a photomultiplier tube 22a is located to extend over sections 18a of crystal 10a, 20b of crystal 10b, 20d of crystal 10d, and 18c of crystal 10c. This arrangement is further illustrated in FIG. 2 which shows an bottom view of the portion of a particle detector assembly employing particle detector crystals and photomultiplier tubes as illustrated in FIG. 1. Thus, as is illustrated in FIGS. 1 and 2, the center of a photomultiplier tube 22a is located at the common corner of sections 18a, 20b, 20d and 18c of crystals 10a, 10b, 10d and 10c, respectively. Adjacent photomultiplier tubes 22b-g are similarly arranged with regard to corresponding particle detector crystals. Thus, photo multiplier tubes 22a-g are arranged in a shifted square packing array as illustrated in FIG. 2.

In operation, an event occuring, for example, in crystal 10a as a result of a particle entering section 18a of lower surface 12a would result in the production of light that would be confined to that section of crystal 10a adjacent to lower section 18a by operation of slot 16a. Thus, light emitted through upper section 14a of crystal 10a as a result of that event would have greater intensity in that section of upper surface 14a corresponding to section 18a than that section of upper surface 14a corresponding to section 20a. Accordingly, photomultiplier tube 22a would have a greater light output as a result of that event than photomultiplier tube 22e which has a quadrant aligned over section 20a of crystal 10a as shown in FIG. 2.

Through detection of at least some light in photomultiplier tube 22e and a greater amount of light in photomultiplier tube 22a, a determination may be made that the light producing event occurred in that section of detector 10a corresponding to section 18a, since section 18a of crystal 10a is the only common section for photomultiplier tubes 22a and 22e. If, for example, the light intensity were reversed, that is to say greater light were received in photomultiplier tube 22e than in photomultiplier tube 22a, this relationship of a light received would result in a determination of light producing event occurring in section 20a of crystal 10a.

In a similar manner, the location of light producing events may be determined throughout an array comprising crystals 10a-d and the like and corresponding photomultiplier tubes 22a-g and the like.

Although such conventional particle detector crystals and corresponding particle detector assemblies provide an improvement over particle detector crystals which do not employ internal light bounce impeding slots, such conventional detectors and corresponding assemblies, nevertheless, have the disadvantage of having a large dead volume between photomultiplier tubes in which light emitted from corresponding sections of upper surfaces 14a-d is not detected. For example, as illustrated in FIG. 2, dead areas 24 exist between photomultiplier tubes 22a-g. These dead areas 24 occur in a square packing or shifted square packing arrangement of photomultiplier tubes 22a-g.

It is, accordingly, an object of the present invention to improve the efficiency of known prior art particle detector crystals and associated particle detector assemblies employing internal light bounce reducing slots.

Another object of the present invention is to improve spatial accuracy of known prior art detector crystals and associated particle detector assemblies.

Additional objects and advantages will be set forth in the description which follows and, in part, will be obvious from the description or may be learned by practice of the invention.

SUMMARY OF THE INVENTION

To achieve the foregoing objects and in accordance with the purposes of the invention as embodied and broadly described herein, a particle detector crystal is provided comprising crystal scintillation material which produces light when struck with a particle and which is shaped with substantially parallel upper and lower diamond-shaped surfaces having 60 degree and 120 degree apexes and with an interconnecting sidewall, the crystal scintillation material being further shaped with at least one slot extending from the lower surface into the interior of the material in a direction substantially parallel to a diagonal axis of the lower surface interconnecting the two 120 degrees apexes, a sufficient distance so as to reduce internal light bounce.

Preferably, the upper and lower surfaces have the same shape and size, and the sidewall is perpendicular to the upper and lower surfaces. It is also preferable that the slot extends into the material in a direction perpendicular to the lower surface and that the material contain at least two such slots which are aligned parallel to each other.

A particle detector assembly in accordance with the present invention comprises a plurality of such particle detector crystals which are arranged in groups of six crystals with the 60 degree apexes of the crystals in each group positioned contiguous to each other to form a six pointed star, and with the particle detector assembly further comprising a plurality of light detectors arranged in a hexagonal array with each detector located above a respective situs of the contiguous 60 degree apexes.

BRIEF DESCRIPTION OF THE DRAWINGS

FIG. 2 is a view of the bottom of a conventional particle assembly of the type shown in FIG. 1;

FIG. 4 is a bottom view of a particle detector assembly incorporating the teachings of the subject invention.

DESCRIPTION OF THE PREFERRED EMBODIMENT

Reference will now be made in detail to the present preferred embodiment of the invention as illustrated in the accompanying drawings.

Figure 3:
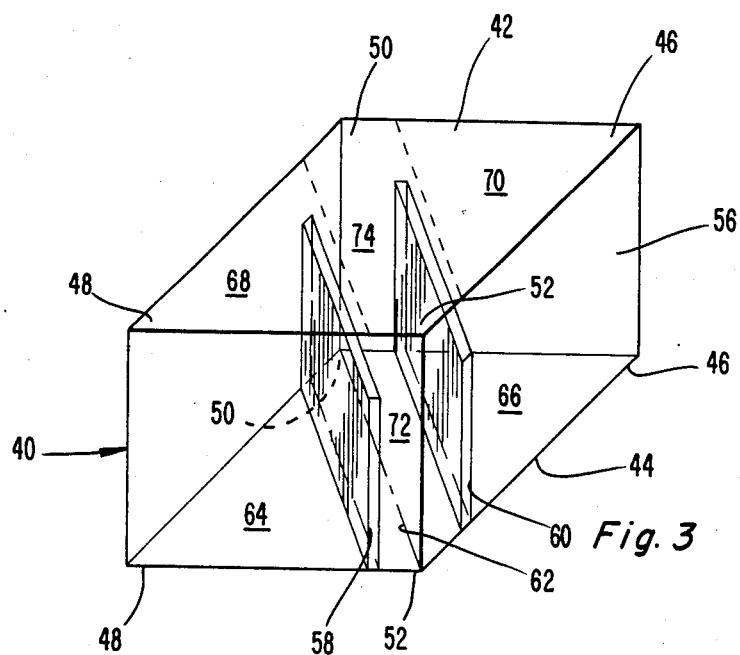
FIG. 3 is a perspective view of a particle detector crystal incorporating the teachings of the subject invention.

In FIG. 3 there is shown a diamond-shaped particle detector crystal 40. Crystal 40 comprises crystal scintillation material which produces light when struck with a particle. Such material may, for example, comprise NaI(Tl). As illustrated in FIG. 3 crystal 40 is shaped with substantially parallel upper 42 and lower 44 diamond-shaped surfaces having 60 degree apexes 46 and 48, and having 120 degree apexes 50 and 52. An interconnecting sidewall 56 is disclosed perpendicular to upper and lower surfaces 42 and 44 to complete the outer surface of crystal 40. Upper and lower surfaces 42 and 44 are illustrated as having precisely the same size and shape, although it should be understood that surface 42 may define a larger or smaller diamond-shape than surface 44. In FIG. 3 sidewall 56 is shown to be perpendicular to surfaces 42 and 44, although it should be understood that surfaces 42 and 44 may be skewed from one another thereby preventing interconnected sidewall 56 from being perpendicular to either surface 42, 44. In addition, if surfaces 42 and 44 are of different size, sidewall 56 will, as a consequence, not be aligned perpendicular to surfaces 42 and 44. Moreover, curved or faceted surfaces might instead be employed.

As is further shown in FIG. 3, crystal 40 has a plurality of slots 58 and 60 extending from lower surface 44 into the interior of crystal 40. Slots 58 and 60 are shown to extend into the interior of crystal 40 in a direction substantially parallel to a diagonal axis 62 of lower surface 44 that interconnects the 120 degree apexes 50 and 52 of lower surface 44. In FIG. 3, slots 58 and 60 are illustrated as being substantially perpendicular to lower surfaces 44 and parallel to one another, although it should be understood that slots 58 and 60 may, in fact, tilt toward or away from one another, thereby defining lower sections 64 and 66 in lower surface 44 which are different in size than corresponding upper sections 68 and 70 in upper surface 42. It is, however, presently preferred that slots 58 and 60 be parallel to one another so that lower sections 64 and 66 and upper sections 68 and 70 are correspondingly sized and shaped.

Figure 1:
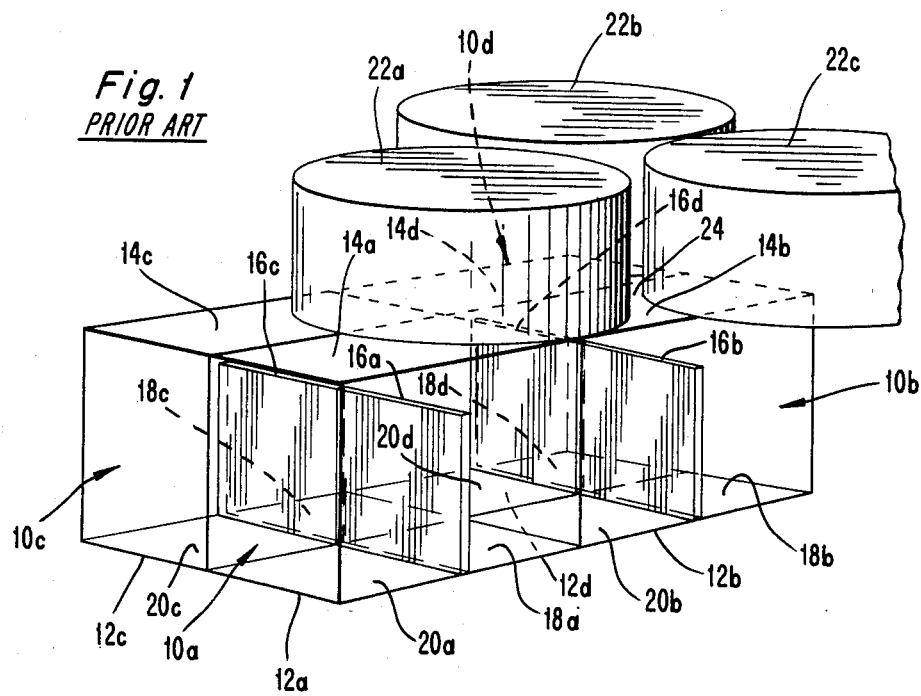
FIG. 1 is a perspective view of a conventional particle detector crystal and related particle detector assembly.

Slots 58 and 60 operate in the same manner as the prior art slots 16a-d of FIGS. 1 and 2. Thus, slots 58 and 60 must extend a sufficient distance into crystal 40 to reduce internal light bounce. For example, slots 58 and 60 may extend on the order of 75 percent into the interior of crystal 40 as is taught in the Govaert patent. Accordingly, particles entering lower section 64 will produce a light distribution from upper surface 42 in which the light intensity is greater in section 68 than in sections 70 or 74. In a similar manner, a light producing event occurring in section 72 of crystal 40 between slots 58 and 60 will result in a light distribution from upper surface 42 which has greater intensity in section 74 corresponding to 72 than in sections 68 and 70 which correspond to sections 64 and 66 of lower surface 44. In a similar manner, light producing events in an area of detector 40 corresponding to section 66 produce light from upper surface 42 having a greater intensity in section 70 than in sections 74 or 68.

By employing a diamond-shaped crystal having 60 and 120 degree apexes, a plurality of such crystals may be arranged in a particle detector assembly in groups of six crystals each, with the 60 degree apexes of the crystals in each group positioned contiguous to one another to form a six-pointed star. With this arrangement of crystals, a particle detector assembly may be formed which includes a plurality of light detectors arranged in a hexagonal array, with each detector located above a respective situs of contiguous 60 degree apexes. The resultant particle detector assembly substantially minimizes the dead volume present in conventional particle detector assemblies employing detector crystals with internal light bounce reduction slots, and substantially increases the spatial resolution of such conventional particle detector assemblies.

Specifically, there is illustrated in FIG. 4 a preferred embodiment of the invention in which a plurality of crystals 40 of the type illustrated in FIG. 3 are shown arranged in groups of six. For example, six such detectors are illustrated in FIG. 4 in the form of crystals 40(1-6). Each has a corresponding 60 degree apex 46(1-6) which are mutually contiguous to each other, thus causing crystals 40(1-6) to form a six-pointed star indicated by heavy outline 80 of FIG. 4. Each of crystals 40(1-6) has corresponding slots 58(1-6) and 60(1-6) which divide the upper surfaces of crystals 40(1-6) into corresponding sections 68(1-6), 70(1-6), and 74(1-6).

In addition, there is shown in FIG. 4 a plurality of light detectors 82 in the form of circular shaped photomultiplier tubes arranged in a hexagonal array, with each detector 82 located above the situs of correspondings contiguous 60 degree apexes of crystals 40. For example, in FIG. 4 particular detector 82(1) is shown centered above a common situs of 60 degree apexes 46(1-6) of crystals 40(1-6).

The disclosed arrangement of crystals 40 and detectors 82 of FIG. 4 provides a substantial improvement in photomultiplier detector efficiency, due to the reduction in dead volume area and the arrangement also provides a substantial improvement in the resultant spatial resolution over the prior art crystal/detector assembly configuration illustrated in FIG. 2. Specifically, the following chart provides an analysis and comparison between the prior art configuration of FIG. 2 and the preferred embodiment of FIG. 4:

| | FIG. 2 | FIG. 4 |
|---|---|---|
| Crystal shape | Rectangular, with a 2:1 length to width aspect ratio | Diamond with 60 degree and 120 degree apexes |
| Photo multiplier tube pattern | Shift square | Hexagonal |
| Photo multiplier tube area utilization | 0.7854 | 0.9068 |
| Crystals per photo multiplier tube | 2 | 3 |
| Locations per crystal | 2 | 3 |
| Locations per photo-multiplier tube (obtained by multiplying crystals per photo multiplier tube times locations per crystals) | 4 | 9 |
| Size of photo-multiplier tube territory for given diameter (D) | $D^2$ | $0.866 D^2$ |
| Area per location | $0.25 D^2/4$ | $0.962 D^2$ |
| Effective linear size of location area (obtained by taking the square root of area per location) | $0.5 D$ | $0.310 D$ |
| Energy discrimination (accuracy) | 20% (as quoted) | 18% (assuming the quoted 20%) |
| Anti-coincidence locations | 44 | 117 |
| Lost area (obtained by multiplying area per location times anti-coincidence locations) | $11 D^2$ | $11.255 D^2$ |
| Count rate | 890,000 events per second (reported) | 870,000 events per second (calculated using lost area and reported count rate for FIG. 2 configuration) |
| Spatial resolution | 9 mm (quoted) | 5.6 mm (using effective linear size of location area) |

As noted in the above chart, since a hexagonal arrangement of circular photomultiplier tubes is a more efficient use of area than shifted square arrangements of circular photo multiplier tubes, the photomultiplier tube area utilization for the FIG. 4 configuration is substantially greater than the photo multiplier tube area utilization for the prior art FIG. 2 configuration.

The chart entry "Crystals per photo multiplier tube" compares the ratio of crystals employed to photo multiplier tubes employed and finds this ratio 2:1 in the FIG. 2 prior art configuration and 3:1 FIG. 4 configuration.

The chart entry "Locations per crystal" identifies the number of locations within each crystal which can be distinguished one from the other. In the FIG. 2 rectangular arrangement, the location of an event in one end or the other of each crystal can be detected. Accordingly, there are two detection locations per crystal. In the FIG. 4 configuration, two slots are used to divide each diamond crystal into three areas with one of those areas pertaining to one photomultiplier tube, another of those areas pertaining to another photomultiplier tube, and the third area identifying a region which borders the two photomultiplier tubes; light caused by detecting an event in the central region 72 will illuminate the two phototubes approximately equally.

The chart entry "Locations per photomultiplier tube" identifies the number of locations that can be detected per photomultiplier tube and shows the average of 9 for the FIG. 4 configuration compared to 4 for the FIG. 2 configuration.

The chart entry "Size of photomultiplier tube territory for given diameter (D)" identifies the area of the total particle detector assembly that each individual photomultiplier tube occupies. Each photo multiplier tube of the FIG. 2 configuration occupies a square of $D^2$ area. Each photomultiplier tube of FIG. 4 configuration occuipies a 0.866$D^2$ area since the FIG. 4 photomultiplier tubes are hexagonally arranged.

The "Effective linear size of location area" in the above chart is the square root of the area per location entry and provides an indication of how accurately the position of any particular event can be measured given a diameter D of the photomultiplier tubes used. As can be seen from the chart, the FIG. 4 positional accuracy is 0.310D as opposed to 0.5D for the FIG. 2 configuration. This represents a substantial positional accuracy improvement.

The "Energy discrimination" entry compares the accuracy of the FIG. 2 and FIG. 4 configurations. The 18% entry for the FIG. 4 configuration was obtained by adjusting the quoted 20% energy discrimination of the FIG. 2 configuration by the ratio of the square roots of the photomultiplier tube area utilization.

The "Anti-coincidence locations" entry in the above-indicated chart is the number of individual locations which must be dedicated to the detection of any particular event.

The "Lost area entry" of the chart is the area of the resultant particle detector assembly which must be dedicated to the detection of any particular event.

The "Spatial resolution" entry anticipates the utilization of a 5.5 millimeter diameter photomultiplier.

Accordingly, the FIG. 4 configuration has improved spatial accuracy without any significant loss of energy discrimination or count rate.

Additional advantages and modifications will readily occur to those skilled in the art. For example, light reflective coatings may be used in these few surface areas which are not covered by a photomultiplier tube to increase light use efficiency. Moreover, hexagonally shaped photomultiplier tubes may be employed to effectively eliminate all such areas and thereby increase resultant accuracy. Thus, the invention, in its broader aspects is not limited to the specific details, representative apparatus and illustrative example shown and described. Accordingly, departures may be made from such details without departing from the spirit or scope of applicant's general inventive concept.

I claim:

1. A particle detector comprising crystal scintillation material which produces light when struck with a particle and which is shaped with substantially parallel upper and lower diamond-shaped surfaces having 60 degree and 120 degree apexes and an interconnecting sidewall, said material being further shaped with at least one slot extending from said lower surface into the interior of said material, in a direction substantially parallel to a diagonal axis of said lower surface interconnecting said 120 degree apexes, a sufficient distance so as to reduce internal light bounce within said material.

2. A detector of claim 1 wherein said upper and lower surfaces have the same shape and size.

3. A detector of claim 2 wherein said sidewall is perpendicular to said upper and lower surfaces.

4. A detector of claim 1 wherein said slot extends into said material in a direction perpendicular to said lower surface.

5. A detector of claim 4 having at least two slots.

6. A detector of claim 5 wherein said slots are parallel to one another.

7. A detector of claim 1 having at least two slots.

8. A dector of claim 7 wherein said slots are parallel to each other.

9. A particle detector assembly comprising a plurality of particle detector crystals, with each crystal comprising scintillation material which produces light when struck with a particle and which is shaped with substantially upper and lower diamondshaped surfaces having 60 degree and 120 apexes and an interconnecting sidewall, each said crystal being further shaped with at least one slot extending from said lower surface into the interior of said crystal in a direction substantially parallel to a diagonal axis of said lower surface interconnecting said 120 degrees apexes, a sufficient distance to reduce internal light bounce within said material, said crystals being arranged in groups of six crystals each with the 60 degree apexes of the crystals in each group positioned contiguous to each other to form a six-pointed star; and a plurallity of light detectors arranged in a hexagonal array with each detector located above a respective situs of said contiguous 60 degree apexes.

10. A detector assembly of claim 9 wherein said upper and lower surfaces of said crystals have the same shape and size.

11. A dectector of claim 10 wherein said sidewall of each crystal is parallel to said upper and lower surfaces of each crystal.

12. A detector of claim 9 wherein slots of each crystal extend into the material of that crystal a direction perpendicular to the lower surface of that crystal.

13. A detector of claim 12 wherein each of said crystals includes at least two slots.

14. A detector of claim 13 wherein said at least two slots are parallel to each other.

15. A detector of claim 9 wherein each of said crystals includes at least two slots.

16. A detector of claim 15 wherein each of said slots is parallel to the other.

* * * * *